No. 709,189. Patented Sept. 16, 1902.
L. WOLF.
FAUCET OR TAP.
(Application filed Mar. 29, 1902.)
(No Model.)
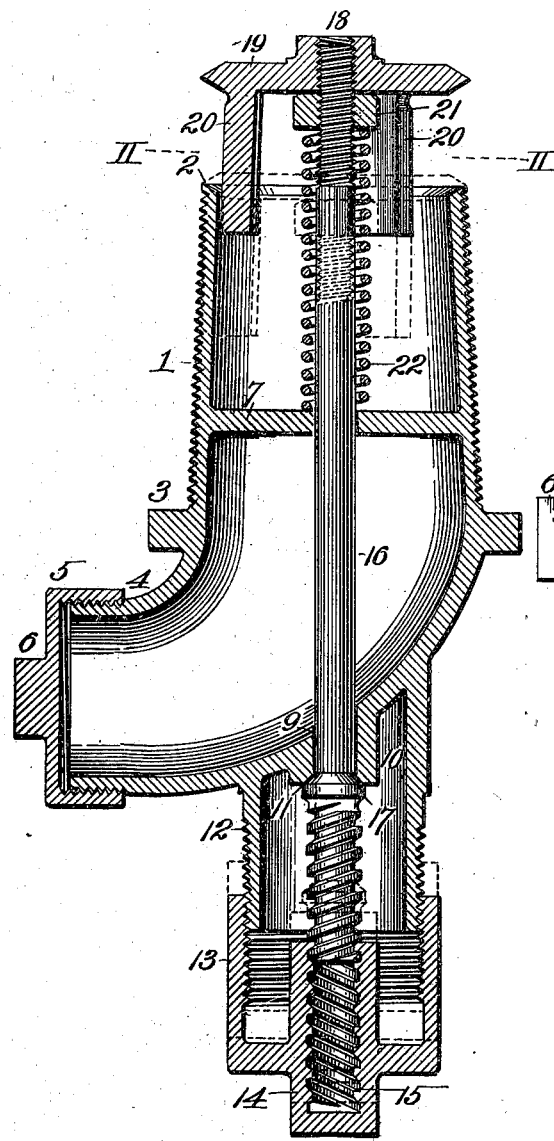
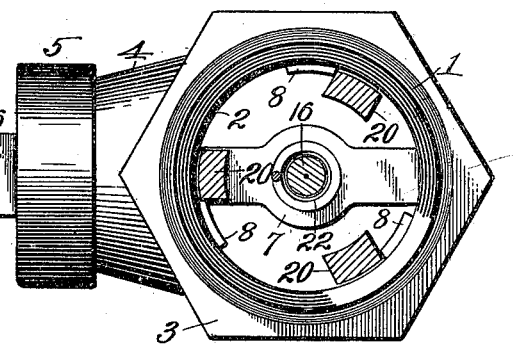
Witnesses:
Inventor:
Leo Wolf.
By Fischer & Thorpe
Attys.

UNITED STATES PATENT OFFICE.

LEO WOLF, OF KANSAS CITY, MISSOURI.

FAUCET OR TAP.

SPECIFICATION forming part of Letters Patent No. 709,189, dated September 16, 1902.

Application filed March 29, 1902. Serial No. 100,506. (No model.)

*To all whom it may concern:*

Be it known that I, LEO WOLF, a citizen of the United States, residing at Kansas City, in the county of Jackson and State of Missouri, have invented certain new and useful Improvements in Faucets or Taps, of which the following is a specification.

My invention relates to taps or faucets for vats or casks; and my object is to produce a device of this character which is efficient and reliable in operation.

To this end the invention consists in certain novel and peculiar features of construction and combinations of parts, as hereinafter described and claimed; and in order that it may be fully understood reference is to be had to the accompanying drawings, in which—

Figure 1 represents a central vertical section of a tap or faucet embodying my invention. Fig. 2 is a horizontal section taken on the line II II of Fig. 1.

In the said drawings, 1 designates a slightly-conical and externally-threaded hollow plug to be screwed into a vat or cask near or at its lower end, the inner or small end of said plug forming a valve-seat 2, its outer end being provided with an external hexagonal enlargement or nut 3, wherewith a wrench is engaged to screw the plug in place. Contiguous to the enlargement or nut the plug is of quadrant shape and terminates in a laterally-projecting nozzle 4, externally screw-threaded to receive and be closed by an internally-threaded cap 5, said cap having an angular boss or head 6 for engagement by a wrench. The cap 5 is employed when the tap or faucet is not in service. When it is in service, the usual hose (not shown) is coupled on the nozzle 4 in place of the cap for the purpose of filling casks or otherwise. The tubular plug 1 is provided at a suitable point with a diametric and centrally-perforated bar 7 and contiguous to the valve-seat with a plurality of internal lugs 8, for a purpose which hereinafter appears. In alinement with the aperture of bar 7 the quadrant portion is provided with a hole 9, which continues through a boss 10, having its end remote from the plug provided with a valve-seat 11. Concentrically surrounding boss 10 is a tubular arm 12, externally threaded, the same, like all of the parts shown and previously described except cap 5, being integrally formed with plug 1.

13 designates an internally-threaded cap engaging threaded arm 12 and provided with a central boss 14, having an internal thread 15, extending oppositely to the thread of arm 12 and pitched at a considerably-greater angle than the latter, by preference. Said internal thread of cap 13 engages the threaded outer end of valve-rod 16, extending slidingly through the aperture of bar 7 and hole 9 and provided with a valve 17, adapted to engage and close the valve-seat 11, as shown by full lines, Fig. 1. The inner end of valve-rod 16 is externally threaded, as at 18, and engages a disk valve 19, adapted to engage seat 2 and close the inner end of the plug, said valve being provided with arms 20, projecting into the plug between lugs 8 thereof, so as to prevent more than a partial rotation of the valve, this partial rotation—namely, about one-fourth of a revolution—being preferred to non-rotation, because a slight grinding upon the seat will tend to mate the two, and thereby provide a more perfect joint. A lock-nut 21, engaging the threaded portion 18 of the rod and the inner side of the valve 19, tends to eliminate independent rotary movement of said parts, and a helical spring 22, surrounding the rod and interposed between the cross-bar 7 and the lock-nut, tends to hold valve 17 tightly against valve-seat 11 should the cap 13 be entirely unscrewed from the tubular arm 12.

In practice the construction and arrangement is such that when the valve 19 is seated upon valve-seat 2 the cap 13 will be screwed as far upon arm 12 as is possible, the valve 17 obviously occupying its most remote position from valve-seat 11. Should it now be desired to charge one or more casks with liquid from the vat, cap 5 is first removed and a hose coupled onto the nozzle. The operator then grasps the cap 13 and unscrews the same either by grasping the body of the cap in his hand or by using a wrench on the projecting portion of boss 14, which portion will preferably be rectangular. As he turns said cap the opposite threads 13 thereof impart longitudinal movement to rod 16 and its valves, such movement taking place because of the fact that the pitch of threads 15 is greater than that of threads 13, as will be readily understood. By the time the valve is fully opened, which result is accomplished very quickly, valve 17 is seated tightly against valve-seat 11 and prevents the escape of liquid through hole 9. When the desired volume of liquid has been drawn off from the cask, the valve is closed by screwing cap 13 home upon arm 12, this action obviously imparting opposite longitudinal movement to rod 16 from that previously described. After the valve is seated the hose is uncoupled and cap 5 replaced, so as to prevent the access of foreign matter into the tap or faucet.

Previous to my invention each cask has been provided with a permanent valve or tap, and then when it was desired to withdraw liquid from the vat or cask a faucet had to be coupled onto the vat-plug, which faucet was then operated so as to unseat the valve and effect the discharge of the liquid.

To remove the faucet, it was first necessary to manipulate it so as to permit the valve to be seated by spring-pressure and then uncouple the faucet. This operation had to be repeated with each cask from which the liquid was to be withdrawn. This device was objectionable in that sometimes the spring failed to properly reseat the valve, this result being followed by a waste of liquid when the faucet was removed.

With my improvement, on the other hand, a positive application of power is necessary to unseat the valve, and the closing of the valve is incidental with the shutting off of the flow of liquid through the holes. It will thus be seen that there can be no waste of liquid and that my improved tap or faucet as a single structure permanently attached to the vat or cask is more reliable than the type above referred to, which consists of a valve permanently secured to the cask or vat and a detachable faucet.

It will be apparent from the foregoing that I have produced a tap or faucet embodying the features of advantage enumerated as desirable and that while I have illustrated and described the preferred embodiment of the invention it is susceptible of modification in some particulars without departing from its spirit and scope or sacrificing any of its advantages.

Having thus described the invention, what I claim as new, and desire to secure by Letters Patent, is—

1. A tap or faucet, comprising a tubular plug, having a valve-seat at one end and terminating in an offsetting arm or nozzle at the other, and provided with a tubular threaded arm in axial alinement with the tubular plug valve-seat, a longitudinally-extending rod arranged centrally of the tubular threaded arm and provided with a valve at one end and a thread at the other, the thread running oppositely to that of the tubular arm, and a threaded cap engaging said threaded arm and provided also with a thread engaging that of the valve-rod, so that when turned longitudinal movement shall be imparted to the rod.

2. A tap or faucet, comprising a tubular plug having a valve-seat at one end and terminating in an offsetting arm or nozzle at the other, and provided internally with a centrally-apertured cross-bar, and externally at the opposite end from said valve-seat with a hole and a second valve-seat, a rod extending through said bar and said hole and provided at one end with a valve to engage the first-named seat, and with a second valve to engage the external valve-seat, and means, carried by the plug for imparting longitudinal movement to said rod so as to simultaneously move said valves toward and from their respective seats.

3. A tap or faucet, comprising a tubular plug having a valve-seat at one end and terminating in an offsetting arm or nozzle at the other, and provided internally with a centrally-apertured cross-bar, and externally at the opposite end from said valve-seat with a hole and a second valve-seat, a rod extending through said bar and said hole and provided at one end with a valve to engage the first-named seat, and with a second valve to engage the external valve-seat, and a spring to hold said rod with its last-named valve yieldingly against said external seat.

4. A tap or faucet, comprising a tubular plug having a valve-seat at one end and terminating in an offsetting arm or nozzle at the other, and provided internally with a centrally-apertured cross-bar, and externally at the opposite end from said valve-seat with a hole and a second valve-seat, a rod extending through said bar and said hole and provided at one end with a valve to engage the first-named seat, and with a second valve to engage the external valve-seat, a spring to hold said rod with its last-named valve yieldingly against said external seat, and means, carried by the plug for withdrawing said rod and reseating the first-named valve against the resistance of said spring.

In testimony whereof I affix my signature in the presence of two witnesses.

LEO WOLF.

Witnesses:
H. C. RODGERS,
G. Y. THORPE.